US006764607B1

(12) United States Patent
Ikegami

(10) Patent No.: US 6,764,607 B1
(45) Date of Patent: Jul. 20, 2004

(54) CORROSION-RESISTANT R-FE-B BONDED MAGNET POWDER FOR FORMING R-FE-B BONDED MAGNET AND METHOD FOR PREPARATION THEREOF

(75) Inventor: Takashi Ikegami, Amagasaki (JP)

(73) Assignee: Sumitomo Special Metals Co., Ltd., Osaka (JP)

( * ) Notice: Subject to any disclaimer, the term of this patent is extended or adjusted under 35 U.S.C. 154(b) by 0 days.

(21) Appl. No.: 10/069,921

(22) PCT Filed: Jun. 12, 2000

(86) PCT No.: PCT/JP00/03816

§ 371 (c)(1),
(2), (4) Date: Apr. 2, 2002

(87) PCT Pub. No.: WO01/20620

PCT Pub. Date: Mar. 22, 2001

(30) Foreign Application Priority Data

| | | |
|---|---|---|
| Sep. 9, 1999 | (JP) | 11-255109 |
| Mar. 15, 2000 | (JP) | 2000-072568 |
| Apr. 12, 2000 | (JP) | 2000-110599 |

(51) Int. Cl.[7] .......................... C04B 35/04; H01F 1/057

(52) U.S. Cl. .................... 252/62.54; 148/101; 148/102; 148/103; 148/122

(58) Field of Search ................................ 148/101, 102, 148/103, 105, 122; 252/62.54

(56) References Cited

U.S. PATENT DOCUMENTS

| | | | | |
|---|---|---|---|---|
| 5,279,785 A | * | 1/1994 | Mohri et al. | 419/2 |
| 5,300,156 A | * | 4/1994 | Mohri et al. | 148/104 |
| 6,074,492 A | * | 6/2000 | Panchanathan | 148/101 |
| 6,136,100 A | * | 10/2000 | Panchanathan | 148/302 |

FOREIGN PATENT DOCUMENTS

| | | | |
|---|---|---|---|
| JP | 1-132107 | * | 5/1989 |
| JP | 4 324 910 | | 11/1992 |

* cited by examiner

*Primary Examiner*—John P. Sheehan
(74) *Attorney, Agent, or Firm*—Dykema Gossett PLLC

(57) ABSTRACT

A powder for forming a R—Fe—B bonded magnet, wherein an R compound, such as an R oxide, an R carbide, an R nitride or an R hydride, which is contained in a raw material powder such as a super rapidly cooled powder or a hydrogen treated powder (HDDR powder) and reacts with water vapor to change into $R(OH)_3$, has been converted to a R hydroxide $R(OH)_3$ being stable in the air by subjecting the raw material powder to a heat treatment in an atmosphere of a pressured water vapor. The powder for forming an R—Fe—B bonded magnet is free from the generation of a white powder in the surface of or inside a bonded magnet formed from the powder and accordingly, is free from the occurrence or cracking, chipping, swelling or the like in the bonded magnet caused by volume expansion of a white powder. Thus, the above powder can be used for preparing an R—Fe—B bonded magnet which is free from the white powder which has been observed in a conventional R—Fe—B bonded magnet in the use for a long period of time and is reduced in the occurrence of defects such as cracking, chipping, swelling and the like.

15 Claims, No Drawings

CORROSION-RESISTANT R-FE-B BONDED MAGNET POWDER FOR FORMING R-FE-B BONDED MAGNET AND METHOD FOR PREPARATION THEREOF

TECHNICAL FIELD

This invention relates to a corrosion-resistant R—Fe—B bonded magnet wherein are prevented the occurrence of flaws due to corrosion and the occurrence of flaws such as cracking, chipping, and swelling associated with the generation of white powder generated during the use of an R—Fe—B bonded magnet. Stated in greater detail, the present invention relates to a corrosion-resistant R—Fe—B bonded magnet wherein the occurrence of corrosion and white powder due to such as R hydroxides that cause cracking and chipping is prevented by causing an R compound such as an R oxide, R nitride, R carbide, or R hydride that becomes $R(OH)_3$ when it reacts with steam to be contained at 10 ppm or less and $R(OH)_3$ to be contained at from 1 ppm to 200 ppm in the powder for molding the magnet in a process wherein treatment is performed in a water vapor pressure atmosphere, or by also, after formation, coating the surface of the R—Fe—B bonded magnet with an organic resin, and to powder for molding such magnet and methods for manufacturing such magnet and powder.

BACKGROUND ART

By employing Fe and/or R (rare earth element Nd, Pr, or the like) that is an inexpensive abundant resource as the main components, R—Fe—B permanent magnets exhibit higher performance and can be fabricated at lower cost than conventional high-performance Sm—Co magnets. For that reason, these are being used today in the manufacture of sintered magnets and bonded magnets of various configuration and used in a wide range of applications.

In general, an R—Fe—B bonded magnet is fabricated by molding it after mixing a resin bonding agent into the powder for molding that bonded magnet. The powder for molding such an R—Fe—B bonded magnet is manufactured by an ingot pulverizing method, Ca reduction diffusion method, low-cost rapid quenching method, or, alternatively, by a hydrogenating treatment (HDDR method) wherewith a recrystallized fine structure is obtained and magnetic anisotropy can be effected.

It is known that the R—Fe—B bonded magnet described above is susceptible to a phenomenon whereby, during prolonged use in the atmospheric air, white powder is generated on the surface of and in the interior of the magnet, and that there are cases where, due to the volumetric expansion of that white powder, such defects as magnet cracking, chipping, or swelling occur.

This white powder generation phenomenon produces fatal defects in applications in motors and the like where exacting dimensional precision is demanded, which constitute important applications of bonded magnets, and in applications where cleanness is demanded, as in hard disk drives and the like.

DISCLOSURE OF THE INVENTION

An object of the present invention is to provide powder for molding an R—Fe—B bonded magnet, and an R—Fe—B bonded magnet, together with manufacturing methods therefore, wherewith, in the R—Fe—B bonded magnet, the white powder generation described above is prevented, and the occurrence of flaws such as cracking, chipping, and swelling associated therewith is prevented.

As a result of various studies on the causes of the volumetric expansion phenomenon associated with the generation of white powder generated in bonded magnets, the attention of the inventors was drawn to the fact that, by the admixture of slag into the raw material alloy during the melting-manufacture or heat treatment of raw material powder for bonded magnets, and surface reactants and the like, 1 to 200 ppm or so of R oxide, carbide, nitride, and hydride (R compounds) are produced, and to the fact that those various R compounds react with water vapor in the air and thus change to an R hydroxide.

In raw material powder for R—Fe—B bonded magnets, rapidly quenched powder produced by the rapid quenching method is obtained by rendering an alloy melt amorphous by rapid quenching by a quenching roller, and then performing a crystallizing heat treatment. Also, as for the hydrogenation treated powder, raw material powder obtained by an ingot pulverizing method or Ca reduction diffusion method or the like is subjected to a hydrogen occlusion treatment and dehydration treatment, and a fine recrystallized structure having magnetic anisotropy can be obtained.

When the rapidly quenched powders described above or a hydrogenation processed powder (HDDR), in particular, is used in raw material for R—Fe—B bonded magnets, these raw material powders are such that, due to the heat treatment during the manufacturing process described earlier, even if the contained R oxide or carbide or the like should become an R hydroxide that is stable in air, the R hydroxide will again change to an R oxide that is unstable in air in that heat treatment.

The inventors learned that, in a bonded magnet manufactured using the rapidly quenched powder or hydrogenation treated powder noted earlier, during long-term use, the R oxide and carbide and the like contained in the bonded magnet become causes of cracking, chipping, and swelling and the like in the bonded magnet by reacting with water vapor in the air and changing to an R hydroxide, whereupon white powder generation on the surface or in the interior of the bonded magnet occurs, and that white powder exhibits volumetric expansion.

Thereupon the inventors noted that, of the R compounds, the R hydroxide is the most stable in air at room temperature, and learned that, by causing the R compounds such as R oxide, carbide, nitride, and hydride present in the powder for molding bonded magnets to change to an R hydroxide beforehand, immediately prior to molding, and stabilizing them, and making the residual content of the R compounds 10 ppm or less, the volumetric expansion associated with the generation of white powder, which becomes a cause of cracking, chipping, and swelling and the like in R—Fe—B bonded magnets during use, can be prevented. They also learned that this prevention method can prevent the volumetric expansion associated with the generation of white powder even without effecting a coating.

The inventors also conducted studies on the corrosion that is a peculiar problem with R—Fe—B bonded magnets. Corrosion occurs when the $R_2Fe_{14}B$ phase that strongly affects magnetic characteristics in bonded magnets is oxidized. Coating an organic resin onto the surface of the magnet is effective in preventing the corrosion that is generated in a conventional R—Fe—B permanent magnet. However, it was learned that, depending on the conditions of use, with the coating method noted above, pinholes develop unavoidably in the organic resin coating layer obtained by such coating application, resulting in the problem that the occurrence of corrosion cannot be prevented.

Thereupon, the inventors, as a result of further studies made on superior corrosion prevention and on preventing the volumetric expansion associated with white powder generation, learned that 1) after treating rare earth compounds that generate white powder such as R oxide, R nitride, R oxide, and R hydride that are unavoidably contained in raw material powder for R—Fe—B bonded magnets in a water vapor atmosphere under certain conditions, changing them to R hydroxides, and then mixing a binding agent resin into the molding powder, performing molding, and obtaining a bonded magnet of the prescribed shape and dimensions,
2) by coating a certain quantity of a fluorine resin and organic resin containing one or two or more types of a pigment or organic complex salt dye onto the surface of the bonded magnet,
3) the intrusion of moisture or the like from unavoidable pinholes occurring in the resin coating layer is prevented by a water repellancy imparted by the fluorine resin being contained, and
4) the penetration of the organic resin coating film by an oxide gas other than water is blocked by the pigment, or, alternatively, by the anticorrosive effect of the organic complex salt dye, white powder and corrosion generation can be simultaneously prevented, whereupon they perfected the present invention.

BEST MODE FOR CARRYING OUT THE INVENTION

The present invention is characterized in that raw material powder for an R—Fe—B bonded magnet is treated in a water vapor pressure atmosphere, such R compounds contained in the raw material powder as R oxides, carbides, nitrides, and hydrides are changed to an R hydroxide ($R(OH)_3$) that is stable in air, and powder containing that is obtained.

The present invention is targeted at raw materials for R—Fe—B bonded magnets made by any manufacturing method, but is particularly targeted at magnet raw material powders obtained by the crystallizing heat treatment of raw material powder in an amorphous state obtained by the rapid quenching method, or magnet raw material powder obtained by $H_2$ occlusion treatment, and de-$H_2$ treatment hydrogenation treatment for rendering to a fine recrystallized structure powder obtained by an ingot pulverization method, and so on wherewith white powder generation readily occurs.

Describing such in greater detail, the powders that can be adopted for the raw material powder used for the R—Fe—B bonded magnets include those obtained by a melting-pulverizing method wherewith the prescribed R—Fe—B alloy is melted, cast, and then pulverized, by a direct reduction diffusion method wherewith powder is obtained directly by Ca reduction, by a quenched alloy method wherewith the prescribed R—Fe—B alloy is made into ribbon foil by a melting jet-caster and that is pulverized and annealed, by a gas atomizing method wherewith the prescribed R—Fe—B alloy is melted, made into powder by gas atomization, and heat-treated, and by a mechanical alloy method wherewith a prescribed raw material metal is made into powder, then made into stile powder by mechanical alloying and heat-treated.

Furthermore, in raw material powder for R—Fe—B bonded magnets, there is rapidly quenched powder obtained by quenching a prescribed alloy melt with a quenching roller, making it amorphous, and then subjecting it to a crystallizing heat treatment, and hydrogenation treated powder obtained by taking coarsely pulverized powder obtained by coarsely pulverizing an alloy ingot of a prescribed composition, heating and holding that at a temperature of 500° C. to 900° C. for 30 minutes to 8 hours, for example, either in 0.1 atm (10 kPa) or higher but 10 atm (1 MPa) or lower (room temperature conversion, hereinafter represented as 0.1 atm (10 kPa) to 10 atm (1 MPa), with the same applying to ranges of other units indicated as from some value to some value) of $H_2$ gas or in an inactive or inert gas (excluding $N_2$ gas) having an $H_2$ partial pressure equivalent thereto, and then subjecting that to a de-$H_2$ treatment by holding it at 500° C. to 900° C. for 30 minutes to 8 hours under a 1×10−2 Torr (1.33 Pa) $H_2$ partial pressure to yield such hydrogenation treated powder comprising a fine recrystallized aggregate structure having an average crystal particle size of 0.05 $\mu$m to 1 $\mu$m.

In the present invention, in the heat treatment in the water vapor pressure atmosphere, the water vapor pressure should preferably be 15 mmHg (2 kPa) to 350 mmHg (45 kPa). At a water vapor pressure of less than 15 mmHg (2 kPa), the reaction to R(OH)3 is insufficient, and requires a long time, leading to high manufacturing costs, wherefore that is undesirable. When 350 mmHg (45 kPa) is exceeded, on the other hand, the magnetic characteristics of the magnetic raw material powder decline greatly, wherefore that is not desirable. An even more preferable water vapor pressure range is 50 mmHg (6.5 kPa) to 200 mmHg (26 kPa).

In the present invention, the treatment temperature should preferably be within a range of −10° C. to 200° C. At less than −10° C., a long time is required for the reaction, leading to high manufacturing costs, whereas when 200° C. is exceeded, the magnetic characteristics of the magnetic raw material powder decline greatly, wherefore that is not desirable. A more preferable heat treatment temperature range is 0° C. to 100° C., and even more preferable is a temperature range of 30° C. to 80° C.

In the present invention, the heat treatment time should preferably be from 3 hours to 260 hours, with heating for 25 to 40 hours being preferable when the heating temperature is 40° C., and heating for 5 to 10 hours being preferable when the heating temperature is 80° C., for example.

In the present invention, air, Ar, or $N_2$ or the like can be selected for the atmosphere wherein the heat treatment is done. For the pressure during heating, moreover, atmospheric pressure is desirable because the equipment then can be made low-cost, but the heat treatment may also be done under increased or reduced pressure. The conversion to $R(OH)_3$ is done by water vapor, moreover, but there is no particular limitation on the type of gas so long as an equivalent reaction occurs therewith.

In the magnet molding powder of the present invention, if the R compound that reacts with water vapor to become $R(OH)_3$ is contained in excess of 10 ppm, it will react with the water vapor to produce a white powder, wherefore that is not desirable, whereupon the R compound content is made 10 ppm or less.

The magnet molding powder according to the present invention is characterized by containing $R(OH)_3$, but that content should be from 1 ppm to 200 ppm. It is, practically speaking, impossible to obtain magnet raw material wherein that amount is less than 1 ppm, whereas, when 200 ppm is exceeded, the volume effective as a magnet decreases too much, so that the magnetic characteristics decline, and, for that reason, that is not desirable.

In the present invention, the R—Fe—B bonded magnet in view may be either an isotropic or anisotropic bonded magnet. In the case of compression molding, for example, such a magnet is obtained by adding and kneading a thermosetting resin, coupling agent, and lubricants and the like into magnetic powder of the prescribed composition and properties, then performing compression molding and heating to set the resin. In the case of injection molding, extrusion molding, and rolling molding, such a magnet is obtained by adding and kneading a thermoplastic resin, coupling agent, and lubricants and the like into the magnetic powder, and then molding it by one of those molding methods, namely injection, extrusion, or rolling.

In the present invention, for the binder resin, 6 Pa, 12 Pa, PPS, PBT, or EVA or the like can be used in injection molding, PVC, NBR, CPE, NR, or Hypalon or the like in extrusion molding, calender rolling, and rolling molding, and epoxy resins, DAP, or phenol resins or the like in compression molding, and, as necessary, a commonly known metal binder can be used. As an auxiliary material, moreover, a lubricant or resin and inorganic filler bonding agent, or silane- or titanium-based coupling agent or the like can be used.

In the present invention, the fluorine resin contained in the organic resin coating the bonded magnet surface to prevent corrosion is n component for imparting water repellency to the coating layer. If that fluorine resin content is less than 2 wt. %, adequate water repellency cannot be imparted to the coating layer, whereas if it exceeds 70 wt. %, adequate bonding properties between the coating layer and the magnet are not realized, wherefore the amount of fluorine resin contained is made 2 wt. % to 70 wt. %, with a range of 2 wt. % to 40 wt. % being preferred.

The fluorine resin is one type selected from among Polytetrafluoroethylene resin (PTFE), Tetrafluoroethylene perfluoroalkoxy vinyl ether copolymer resin (PFA), Perfluoro ethylene-propylene copolymer resin (FEP). Ethylene-propylene perfluoroalkoxy vinyl ether copolymer resin (EPE), Ethylene tetrafluoroethylene copolymer resin (ETFE), Polychlorotrifluoroethylene resin (PCTFE), Ethylenchlorotrifluoroethylene copolymer resin (ECTFE), Polyvinylidene fluoride resin (PVDF), and Polyvinyl fluoride resin (PVE). Of these, Polytetrafluoroethylene resin (PTFE) is preferable, and PTFE resin having a low molecular weight (molecular weight of 500,000 or less) is particularly preferable in the interest of adhesion.

The pigment contained in the organic resin coating layer is made to be contained in order to disperse the penetration paths for the oxidizing gases such as oxygen in the coating layer and give the coating layer a structure difficult to penetrate by those gases. For this pigment, one such as titanium dioxide, cobalt oxide, iron oxide, or carbon black is used.

If the amount of such pigment contained is less than 0.5 wt. %, the effect in scattering the gas penetration paths noted above is inadequate, whereas when 50 wt. % is exceeded, the bonding property enhancing components of the organic resins such as acrylic resins, epoxy resins, phenol resins, or polyester resins contained in the organic resin coating layer are diminished, whereupon adequate bonding properties are not obtained, wherefore those extremes are undesirable and the content range is limited to 0.5 wt. % to 50 wt. %.

The dye in the organic resin coating layer is contained because of its corrosion preventing effect, and a chromium complex salt dye is preferable as that dye. If the amount of that dye contained is less than 0.2 wt. %, the corrosion preventing effect will be markedly small, whereas when 10 wt. % is exceeded that effect is saturated and so is not desirable, wherefore the content range is limited to 0.2 wt. % to 10 wt. %.

When a pigment is contained as a complex with the dye, the amount of the pigment contained should be from 0.2 wt. % to 50 wt. %. If less than 0.2 wt. %, the effect in dispersing the oxidizing gas penetration paths is inadequate, whereas when 50 wt. % is exceeded, the bonding property enhancing components of the organic resins such as epoxy resin contained in the organic resin coating layer are diminished, and adequate bonding properties are not realized.

In the present invention, besides the pigment and the fluorine resin contained in the organic resin coating layer, one or two or more types selected from among acrylic resins, epoxy resins, phenol resins, and polyester resins are contained. The reason for that is that, because the bonding properties between the metals and the other resins are inferior with only the fluorine resin, a high baking temperature of 400° C. is required for the coating in order to enhance and improve the bonding properties, wherefore it must be done to prevent both the promotion of the oxidation or decomposition of the magnet powder and binding resin in the coated magnet and the ill effects such would produce.

In other words, with the present invention, the bonding properties between the coating layer and the magnet, and of magnetic circuit configuring members that bond the magnet having the coating layer are enhanced by selecting one or two or more types of an acrylic resin, epoxy resin, phenol resin, or polyester resin exhibiting good bonding properties with the bonding agent that bonds the magnetic powder and binding resin in the coated magnet and that coated magnet and a magnetic circuit configuring member such as a yoke.

If the thickness of the organic resin coating layer on the bonded magnet surface is less than 1 μm, the organic resin coating layer will not become uniform, wherefore it will not be possible to realize adequate water repellency or interrupt the oxidizing gas penetration dispersion paths, whereas when 50 μm is exceeded, higher cost is incurred without improving the effectiveness thereof, wherefore those extremes are not desirable, and the thickness range is limited to 1 μm to 50 μm, with a coating layer thickness of 5 to 30 μm being preferable.

In the present invention, although there is no particular limitation on the composition of the R—Fe—B magnet raw material powder, the compositions noted below are preferable in terms of magnet composition. The rare earth element R accounts for 10 at. % to 30 at. %, but at least one type from among Nd, Pr, Dy, Ho, and Tb, or, in addition thereto, at least one type from among La, Ce, Sm, Gd, Er, Eu, Tn, Yb, Lu, and Y should be contained. Also, while ordinarily one type of R will be sufficient, in practice a mixture of two or more types (such as misch metal or didymium) can be used for reason of ready availability or the like. Furthermore, this R need not be a pure rare earth element, and there is no problem with it containing such impurities as are unavoidable in manufacture, within such range as can be industrially procured.

R is a mandatory element in the magnetic powder of such type as described in the foregoing. If the R content is less than 10 at. %, much α-iron will be precipitated, and high magnetic characteristics, especially high coercive force, will not be obtained, whereas, when it exceeds 30 at. %, an R-rich nonmagnetic phase increases, the residual flux density (Br) declines, and a permanent magnet of outstanding characteristics is not obtained. Accordingly, an R content range of 10 at. % to 30 at. % is desirable.

B is a mandatory element in the magnetic powder of such type as described in the foregoing. If the B content is less than 2 at. %, a different structure, other than an $Nd_2Fe_{14}B$ tetragonal structure, will become the main phase and high coercive force (iHc) will not be obtained, whereas when 28 at. % is exceeded, a B-rich nonmagnetic phase increases, the residual flux density (Br) declines, and a permanent magnet of outstanding characteristics is therefore not obtained. Accordingly, a B content range of 2 at. % to 28 at. % is desirable.

Fe is a mandatory element in the magnetic powder of such type as described in the foregoing. If the Fe content is less than 65 at. %, the residual flux density (Br) will decline, whereas when 80 at. % is exceeded, high coercive force is not obtained, wherefore it is preferable that 65 at. % to 80 at. % of Fe be contained.

Furthermore, by substituting Co for some of the Fe, the temperature characteristics can be improved without impairing the magnetic characteristics of the magnets obtained. However, when the Co substitution quantity exceeds 50% of the Fe content, the magnetic characteristics deteriorate, conversely, wherefore that is not desirable. When the Co substitution quantity is 5 at. % to 30 at. % of Fe, Br will increase more than when no substitution is made, wherefore that is desirable in order to obtain high flux density.

Beside R, B, and Fe, moreover, the presence of impurities that are unavoidable in industrial manufacture is allowed. For example, by substituting for a part of the B at least one type from among C (at 4.0 wt. % or less), P (at 2.0 wt. % or less), and S (at 2.0 wt. %), for a total quantity that is 2.0 wt. % or less, it is possible to improve the manufacturability of the permanent magnets and lower the cost thereof.

It is also possible to add at least one type from among Al, Ti, V, Cr, Mn, Bi, Nb, Ta, Mo, W, Sb, Ge, Ga, Sn, Zr, Ni, Si, Zn, Hf, and Cu to the magnet powder because of the effectiveness thereof in improving coercive force and the squareness of the demagnetization curve, or in improving manufacturability and lowering the cost. The upper limit of the amount added, moreover, should be within a range wherein those conditions necessary for realizing the required values for the (BH)max and (Br) of the bonded magnet are satisfied.

EXAMPLES

Example 1

Coarsely pulverized powder was used, obtained by ingot pulverization, having an average particle size of 150 $\mu$m, and a composition consisting of 12.8 at. % R, 6.3 at. % B, 14.8 at. % Co, 0.25 at. % Ga, 0.09 at. % Zr and the remainder Fe. The coarsely pulverized powder was subjected to an $H_2$ occlusion treatment, holding it for 1.5 hours at 820° C. in 1 atm (100 kPa) (room temperature equivalent) of $H_2$ gas, then subjected to a de-$H_2$ treatment, holding it for 0.5 hour at 850° C. in flow of Ar gas at a reduced pressure of 40 Torr (5332.9 Pa) to yield a hydrogenation-treated powder having a fine recrystallized aggregate structure with an average crystal particle size of 0.4 $\mu$m. The $R_2O_3$ content in the hydrogenation-processed powder so obtained was 200 ppm and the $R(OH)_3$ content therein was 0.9 ppm.

Taking this hydrogenation-treated powder as magnet raw material powder, it was subjected to a heat treatment, holding it for 15 hours at a temperature of 70° C. in an atmosphere having a water vapor pressure of 180 mmHg (23 kPa) to yield a molding powder. The $R_2O_3$ content in the molding powder so obtained was 7 ppm and the $R(OH)_3$ content therein was 180 ppm.

Into the molding powder so obtained were mixed 3.5 wt. % of an epoxy resin, and that was then molded, under a molding pressure of 6 T/cm$^2$, in a magnetic field of 12 kOe (950 kA/m), to dimensions of 10 mm×10 mm×10 mm, after which heating was performed for 60 minutes at a hardening temperature of 150° C., whereupon 50 bonded magnets were fabricated.

The bonded magnets so obtained were subjected to accelerated tests, being allowed to stand for 12 hours in a 0.2 MPa atmosphere at 125° C. and 85% relative humidity. Under these testing conditions, no red rusting occurred, and only white powder could be tested. The external conditions and defect ratio at that time were measured, and the results are given in Table 1.

Example 2

Using molding powder manufactured in the same composition and under the same conditions as in Example 1, 50 bonded magnets were fabricated under the same conditions as in Example 1.

Onto the surface of the bonded magnets so obtained was applied, by spraying, a solution made by dissolving and dispersing an organic resin consisting of 30 wt. % of PTFE as the fluorine resin, 2 wt. % of carbon black as the pigment, and the remainder of an epoxy resin, in an organic solvent, drying that, and performing a setting treatment for 30 minutes at 150° C. to yield bonded magnets having an organic coating layer having a thickness of 25 $\mu$m.

The bonded magnets so obtained were allowed to stand for 1000 hours at 80° C. and 90% relative humidity. Furthermore, the conditions of these tests were conditions under which both red rust and white powder could be tested for. The magnetic characteristics thereof, external conditions, and defect ratio thereof were measured, and the results are given in Table 2.

Example 3

Using molding powder manufactured in the same composition and under the same conditions as in Example 1, 50 bonded magnets were fabricated under the same conditions as in Example 1. Onto the surface of the bonded magnets so obtained was applied, by spraying, an organic resin consisting of 6 wt. % of PTFE as the fluorine resin, 3 wt. % of a chromium complex salt dye as the organic complex salt dye, 48 wt. % of an epoxy resin for the remainder, and 43 wt. % of an acrylic resin, and performing a setting treatment under the same conditions as in Example 2 to yield bonded magnets having an organic coating layer having a thickness of 25 $\mu$m.

The bonded magnets so obtained were allowed to stand for 1000 hours at 80° C. and 90% relative humidity. Then the magnetic characteristics thereof, external conditions, and defect ratio thereof were measured, and the results are given in Table 2.

Example 4

Using molding powder manufactured in the same composition and under the same conditions as in Example 1, 50 bonded magnets were fabricated under the same conditions as in Example 1. Onto the surface of the bonded magnets so obtained was applied, by spraying, an organic resin consisting of 25 wt. % of PTFE as the fluorine resin, 1 wt. % of carbon black as the pigment, 3 wt. % of a chromium complex salt dye as the organic complex salt dye, 48 wt. % of an epoxy resin for the remainder, and 23 wt. % of a polyester resin, and performing a setting treatment under the same conditions as in Example 2 to yield bonded magnets having an organic coating layer having a thickness of 20 $\mu$m.

The bonded magnets so obtained were allowed to stand for 1000 hours at 80° C. and 90% relative humidity. Then the magnetic characteristics thereof, external conditions, and defect ratio thereof were measured, and the results are given in Table 2.

Comparative Example 1

Using hydrogenation-treated powder obtained by the same processes as in Example 1, bonded magnets were fabricated under the same conditions as in Example 1, immediately, without performing a heat treatment in a water vapor atmosphere. The R compounds contained in the bonded magnets so obtained were measured, resulting in an $R_2O_3$ quantity of 190 ppm and an $R(OH)_3$ quantity of 0.3 ppm.

The bonded magnets so obtained were subjected to accelerated tests, being allowed to stand for 12 hours in a 0.2 MPa atmosphere at 126° C. and 85% relative humidity. The external conditions and defect ratio at that time were measured, and the results are given in Table 1.

Comparative Example 2

Using hydrogenation-treated powder obtained by the same processes as in Example 1, water vapor heat treatment and bonded magnet molding were performed under the same conditions as in Example 1. The bonded magnets so obtained were coated, by spraying, only with a polyester resin, and baked under the same conditions as in Example 2. The bonded magnets so obtained were allowed to stand for 1000 hours at 80° C. and 90% relative humidity. Then the magnetic characteristics thereof, external conditions, and defect ratio thereof were measured, and the results are given in Table 2.

Comparative Example 3

Bonded magnets obtained by the same processes as in Comparative Example 1 were subjected to organic resin coating and setting treatment by the same processes and under the same conditions as in Example 2, yielding bonded magnets having an organic coating layer having a thickness of 30 $\mu$m. The bonded magnets so obtained were allowed to stand for 1000 hours at 80° C. and 90% relative humidity. Then the magnetic characteristics thereof, external conditions, and defect ratio thereof were measured, and the results are given in Table 2.

TABLE 1

| | External Conditions (Number of Occurrences) | | | |
|---|---|---|---|---|
| | Crack flaws | Chip flaws | Swellings | Defect Ratio (%) |
| Example 1 | 0 | 0 | 0 | 0 |
| Comparative Example 1 | 10 | 8 | 32 | 100 |

TABLE 2

| | Magnetic Characteristics | | | External Conditions (Number of Occurrences) | | | | Defect |
|---|---|---|---|---|---|---|---|---|
| | Br (kG) (T) | iHc (kOe) k(A/m) | (BH)max (MGOe) (kJ/m3) | Red Rust | Crack flaws | Chip flaws | Swellings | Ratio (%) |
| Example 2 | 8.2<br>0.82 | 11.8<br>939.28 | 15.0<br>119.4 | 0 | 0 | 0 | 2 | 4 |
| Example 3 | 8.2<br>0.82 | 11.8<br>939.28 | 15.0<br>119.4 | 0 | 0 | 0 | 1 | 2 |
| Example 4 | 8.2<br>0.82 | 11.9<br>947.24 | 15.0<br>119.4 | 0 | 0 | 0 | 0 | 0 |
| Comparative Example 2 | 8.1<br>0.81 | 11.7<br>931.32 | 14.7<br>117.012 | 30 | 0 | 0 | 0 | 60 |
| Comparative Example 3 | 8.2<br>0.82 | 11.9<br>947.24 | 15.1<br>120.196 | 0 | 7 | 5 | 28 | 80 |

INDUSTRIAL APPLICABILITY

Conventionally, in R—Fe—B bonded magnets manufactured using rapidly quenched powder or hydrogenation-treated powder as the raw material powder, during long-term use, the R oxides and the like contained in the bonded magnets reacted with the water vapor in the atmosphere and changed to R hydroxides, white powder was generated on the surface or in the interior of the magnets, and, due to the volumetric expansion thereof, such defects as cracking, chipping, and swelling occurred in the bonded magnets.

Based on the present invention, all of the R compound in the bonded magnets that constitute a cause of the white powder generation is changed to R hydroxide and stabilized, wherefore there is no generation of white powder during magnet use, and there are no defects such as cracking, chipping, or swelling in the bonded magnets. Alternatively, moreover, the occurrence of corrosion is prevented by forming an organic resin coating layer on the magnet surface, and it becomes possible to maintain stable external appearance and magnetic characteristics over long periods.

What is claimed is:

1. A corrosion-resistant R—Fe—B bonded magnet comprising:

a resin; and powder for molding an R—Fe—B bonded magnet containing 10 ppm or less of an R compound capable of becoming a rare earth hydroxide in reaction with water vapor, and 1 ppm to 200 ppm of a rare earth hydroxide.

2. A corrosion-resistant R—Fe—B bonded magnet having an organic resin coating layer on the surface thereof comprising:

a resin; and powder for molding an R—Fe—B bonded magnet containing 10 ppm or less of an R compound capable of becoming a rare earth hydroxide in reaction with water vapor, and 1 ppm to 200 ppm of rare earth hydroxide; said organic resin coating layer comprising 2 wt. % to 70 wt. % of a fluorine resin, and 0.5 wt. % to 50 wt. % of pigment or 0.2 wt. % to 10 wt. % of at least one metal complex dye (provided that the pigment content is 0.2 wt. % to 50 wt. % when a metal complex dye is present); and the remainder comprising at least one resin selected from the group consisting of acrylic resin, epoxy resin, phenol resin and polyester resin.

3. The corrosion-resistant R—Fe—B bonded magnet according to claim 2, wherein said organic coating layer has a thickness of 1 μm to 50 μm.

4. A method for manufacturing a corrosion-resistant R—Fe—B bonded magnet comprising the steps of:

treating raw material powder for R—Fe—B bonded magnets in a water vapor pressure atmosphere and obtaining powder for molding an R—Fe—B bonded magnet containing 10 ppm or less of an R compound capable of becoming a rare earth hydroxide in reacting with water vapor, and 1 ppm to 200 ppm of a rare earth hydroxide; and making that powder for molding an R—Fe—B bonded magnet into a bonded magnet.

5. The manufacturing method for manufacturing a corrosion-resistant R—Fe—B bonded magnet including a process for forming an organic resin coating layer, comprising the steps of:

treating raw material powder for R—Fe—B bonded magnets in a water vapor pressure atmosphere and obtaining powder for molding an R—Fe—B bonded magnet containing 10 ppm or less of an R compound capable of becoming a rare earth hydroxide in reacting with water vapor, and 1 ppm to 200 ppm of a rare earth hydroxide;

making that powder for molding an R—Fe—B bonded magnet into a bonded magnet, and forming on the surface of said corrosion-resistant R—Fe—B bonded magnet an organic resin coating layer comprising 2 wt. % to 70 wt. % of a fluorine resin, and 0.5 wt. % to 50 wt. % of pigment or 0.2 wt. % to 10 wt. % of at least one metal complex dye (provided that the pigment content is 0.2 wt. % to 50 wt. % when a metal complex dye is present), and the remainder comprising at least one resin selected from the group consisting of acrylic resin, epoxy resin, phenol resin and polyester resin.

6. The manufacturing method according to claim 5, wherein conditions of treating in said water vapor pressure atmosphere are a water vapor pressure of 15 mmHg (2 kPa) to 350 mmHg (45 kPa), and a treatment temperature of −10° C. to 200° C.

7. The manufacturing method according to claim 6, wherein said conditions of treating in said water vapor pressure atmosphere are a water vapor pressure of 50 mmHg (6.5 kPa) to 200 mmHg (26 kPa), and a treatment temperature of 30° C. to 80° C.

8. The corrosion-resistant R—Fe—B bonded magnet manufacturing method according to claim 5, wherein said organic resin coating layer has a thickness of 1 μm to 50 μm.

9. The corrosion-resistant R—Fe—B bonded magnet manufacturing method according to claim 4, wherein a magnet raw material powder obtained by the rapid quenching method or hydrogenation-treatment method (HDDR method) is used.

10. Powder for molding an R—Fe—B bonded magnet containing: 10 ppm or less of an R compound that reacts with water vapor to become $R(OH)_3$; and 1 ppm to 200 ppm of a rare earth hydroxide.

11. A method for manufacturing powder for molding an R—Fe—B bonded magnet wherein raw material powder for R—Fe—B bonded magnets is treated in a water vapor pressure atmosphere to obtain powder containing 10 ppm or less of an R compound that reacts with water vapor to become $R(OH)_3$, and 1 ppm to 200 ppm of a rare earth hydroxide.

12. The method for manufacturing powder for molding an R—Fe—B bonded magnet according to claim 11, wherein said water vapor pressure is 15 mmHg (2 kPa) to 350 mmHg (45 kPa), and a treatment temperature is −10° C. to 200° C.

13. The method for manufacturing powder for molding an R—Fe—B bonded magnet according to claim 12, wherein said water vapor pressure is 50 mmHg (6.5 kPa) to 200 mmHg (26 kPa), and said treatment temperature is 30° C. to 80° C.

14. The method for manufacturing powder for molding an R—Fe—B bonded magnet according to claim 11, wherein a magnet raw material powder obtained by the rapid quenching method or hydrogenation-treatment method (HDDR method) is used.

15. The manufacturing method according to claim 5 wherein a magnet raw material powder obtained by the rapid quenching method or hydrogenation treatment method (HDDR method) is used.

* * * * *